United States Patent [19]
Coltman et al.

[11] 3,916,198
[45] Oct. 28, 1975

[54] AMPLIFIED-SCINTILLATION OPTICAL-CODED RADIOISOTOPE IMAGING SYSTEM

[75] Inventors: John W. Coltman, Pittsburgh; Eugene G. Vaerewyck, Murrysville, both of Pa.

[73] Assignee: Westinghouse Electric Corporation, Pittsburgh, Pa.

[22] Filed: June 1, 1973

[21] Appl. No.: 366,235

[52] U.S. Cl. ............... 250/363; 250/366; 250/368; 250/369
[51] Int. Cl. ............................................. G01t 1/20
[58] Field of Search ........... 250/363, 366, 368, 369, 250/213 VT

[56] References Cited
UNITED STATES PATENTS
3,462,601  8/1969  Sternglass ..................... 250/213 VT
3,652,855  3/1972  McIntyre et al. .................. 250/366

*Primary Examiner*—James W. Lawrence
*Assistant Examiner*—Davis L. Willis
*Attorney, Agent, or Firm*—D. F. Straitiff

[57] ABSTRACT

A radioisotope imaging system wherein the position of an amplified scintillation is determined by optical coding means that is essentially insensitive to variations in the strength of the scintillation. This permits a more accurate position location and, therefore, a higher resolution in the final image. At the same time, sensitivity remains high, as does discrimination in energy.

10 Claims, 8 Drawing Figures

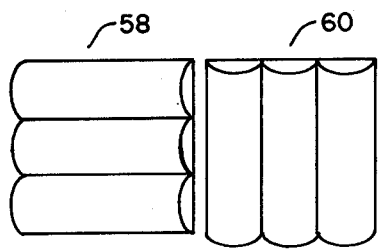
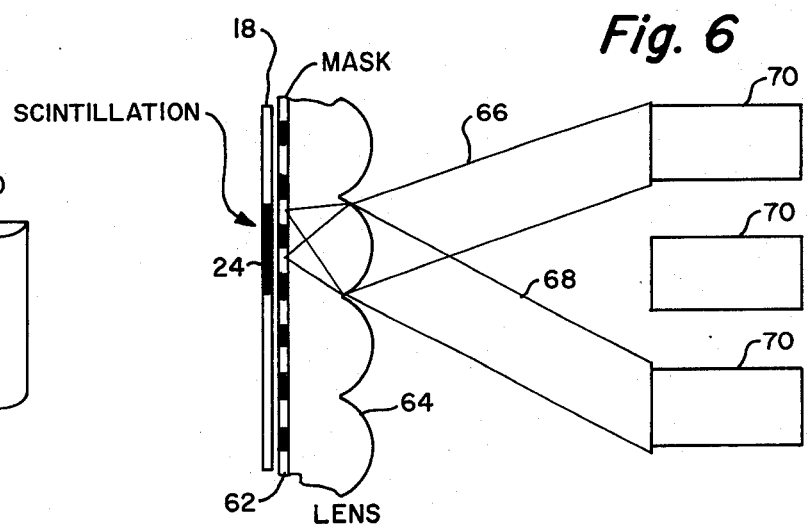
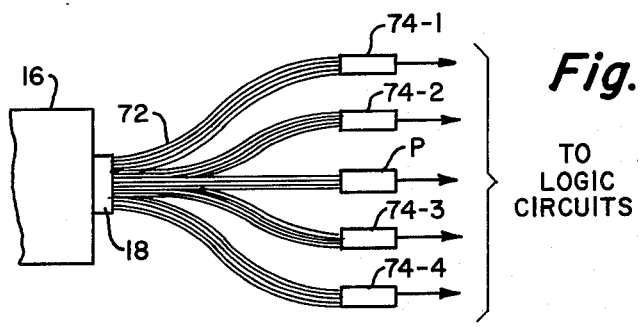
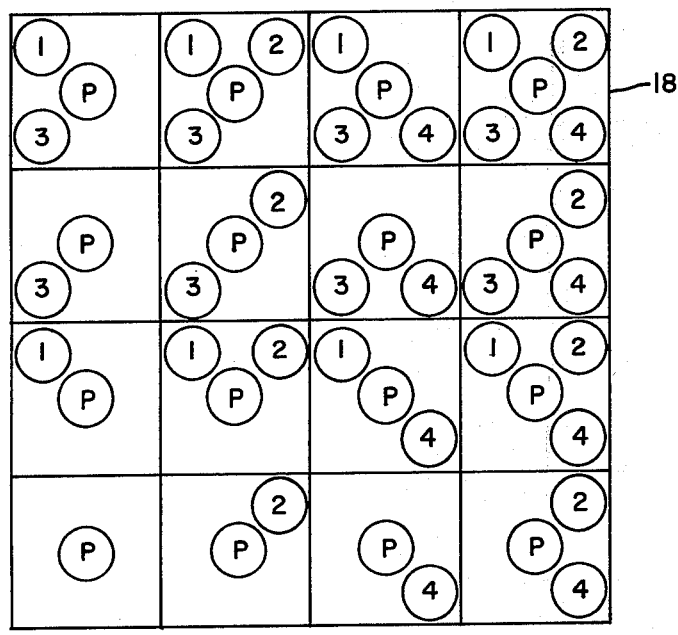

AMPLIFIED-SCINTILLATION OPTICAL-CODED RADIOISOTOPE IMAGING SYSTEM

BACKGROUND OF THE INVENTION

As is known, radioisotope imaging systems have been used in the past for medical diagnosis. Such systems are used to determine the distribution of a radioactive material that has been injected or absorbed into a living body. One method previously used for detecting the spatial distribution of radioisotopes in the human body involves the use of mechanically-scanned scintillation detectors. In this procedure, a directional gamma-ray detector is moved over the subject in a pattern of parallel sweeps, the electrical output of the device being used to reproduce an image of the radioactive distribution upon a recorder. Typically, a mechanical scintillation detector includes a crystal of sodium iodide or the like which is coupled to a multiplying phototube. The detector is supported on a mechanical means such as a boom which reciprocates along a series of parallel, rectilinear paths to cover a predetermined area. Scintillations in the crystal, which occur when gamma rays interact with the crystal, are converted to electrical impulses by the phototube which are, in turn, used to produce a graphical representation of the distribution of the radioactive materials.

Mechanical scintillation detectors of this type, however, require a relatively long time to produce a graphical representation of the distribution. Needless to say, the extended lengths of time may prove to be very uncomfortable to an ill patient who is required to remain motionless throughout the process. Furthermore, such mechanical detectors often require the use of high intensity doses of radiation which may produce an injurious effect on the patient.

Another means of detecting the spatial distribution of radioisotopes is described in Anger U.S. Pat. No. 3,011,057, issued Nov. 28, 1961. In accordance with the system shown in that patent, each of a plurality of photomultiplier tubes receives a share of the light from each scintillation, and infer the position of the scintillation from the relative amounts of light gathered from each. That is, when a scintillation occurs, the light derived from the scintillation is divided among the various photomultiplier tubes, with the closest tube receiving the greatest amount of light. As a result, pulses produced by the various photodetectors will vary in magnitude. These pulses are then applied to an electrical network and to a position computing circuit which produces an output signal which varies as a function of the position of the scintillation upon the image crystal and the intensity of the scintillation brightness. Signals from the computer may then be fed through a pulse height analyzer to a cathode-ray tube where they may be visually displayed, the pulses produced on the face of the tube having positions corresponding to the original scintillations on the image crystal.

While the sensitivity and discrimination of the system shown in the aforesaid Anger U.S. Pat. No. 3,011,057 is high, its resolution is limited by the light available from the scintillation. This is so small that a substantial uncertainty, usually due to photoelectron noise, is associated with the signal in each tube, with a resultant uncertainty in the apparent position.

SUMMARY OF THE INVENTION

In accordance with the present invention, a radioisotope imaging system is provided which employs a plurality of photomultipliers or the like which view an amplified scintillation means and wherein the position of the scintillation is determined not by the relative strength of the signals detected by the photomultipliers but rather by an optical coding means that is essentially insensitive to variations in strength of the signals from the respective tubes.

Specifically, there is provided amplified scintillation means for emitting visible scintillations in a field of view in response to incident radiations, a plurality of electron-optic detectors, an optical system viewing the field of view provided by the scintillation means and which projects light from the field of view onto each of said plurality of electron-optic detectors, and an optical coding means incorporated into the optical system and adapted to block light produced by an amplified scintillation from passing to certain of said detectors while permitting the light to pass to other of the detectors. In this manner, the detectors will produce ON and OFF digital signals comprising an indication of the location of the scintillation in the field of view.

In the preferred embodiment of the invention shown herein, lenses are used to project images of the amplified scintillation field onto masks associated with the electron-optic detectors, each lens projecting the entire field of view onto its associated mask. Any light coming through the mask activates the detector to produce a signal. These masks are coded such that for a given position of the scintillation in the field of view, certain of the masks will block light to their associated detectors while others will not. Furthermore, for each location of the scintillation in the field of view, the combination of detectors which receive light and those which do not changes. As a result, the detectors produce digital ON and OFF signals, the combination of these signals indicating the location of the scintillation in the field of view. These digital signals may then be processed and converted into analog signals which can be applied to a CRT tube or the like for indicating the position of the scintillation.

Since digital signals are produced by the detectors rather than analog signals as was the case in prior art system using a plurality of electron-optic detectors, the system is not directly dependent upon the intensity of the light from the scintillation which impinges upon any detector. As a result, resolution and sensitivity can be maximized.

The lenses, masks and their detectors can be arranged in any geometrical pattern favorable to light-gathering and to minimizing optical distortion. The masks can be coded in either binary, Gray or any other code which will produce at the output of the detectors binary signals indicating the discrete location of a scintillation. In this system, lenses or the like are arranged for focusing the entire field of view of the amplified scintillation means onto each mask. Alternatively, a single lens can be used in combination with a beam splitter arrangement for directing light from the entire field of view of such scintillation means onto masks disposed in front of electron-optic detectors.

Instead of using masks, it is also possible to use fiber optic bundles wherein respective elements in the optic bundle view selected areas of the field of view provided by the scintillation means. By appropriately directing the light detected by the respective elements of the optic bundle to a plurality of detectors, a digital signal can again be produced which will indicate the position of a scintillation in the field of view.

The above and other objects and features of the invention will become apparent from the following detailed description taken in connection with the accompanying drawings which form a part of this specification, and in which:

FIG. 5 illustrates a cylinder lens arrangement which may be utilized in the embodiment of FIG. 1;

FIG. 6 illustrates an embodiment of the invention employing a lenticular screen together with masking for identifying the position of a scintillation;

FIG. 7 illustrates an embodiment of the invention employing a fiber optic coding matrix rather than masks as in the previous embodiments of the invention; and FIG. 8 comprises a map of the fiber optic bundles utilized in the embodiment of FIG. 7.

Figure 1:
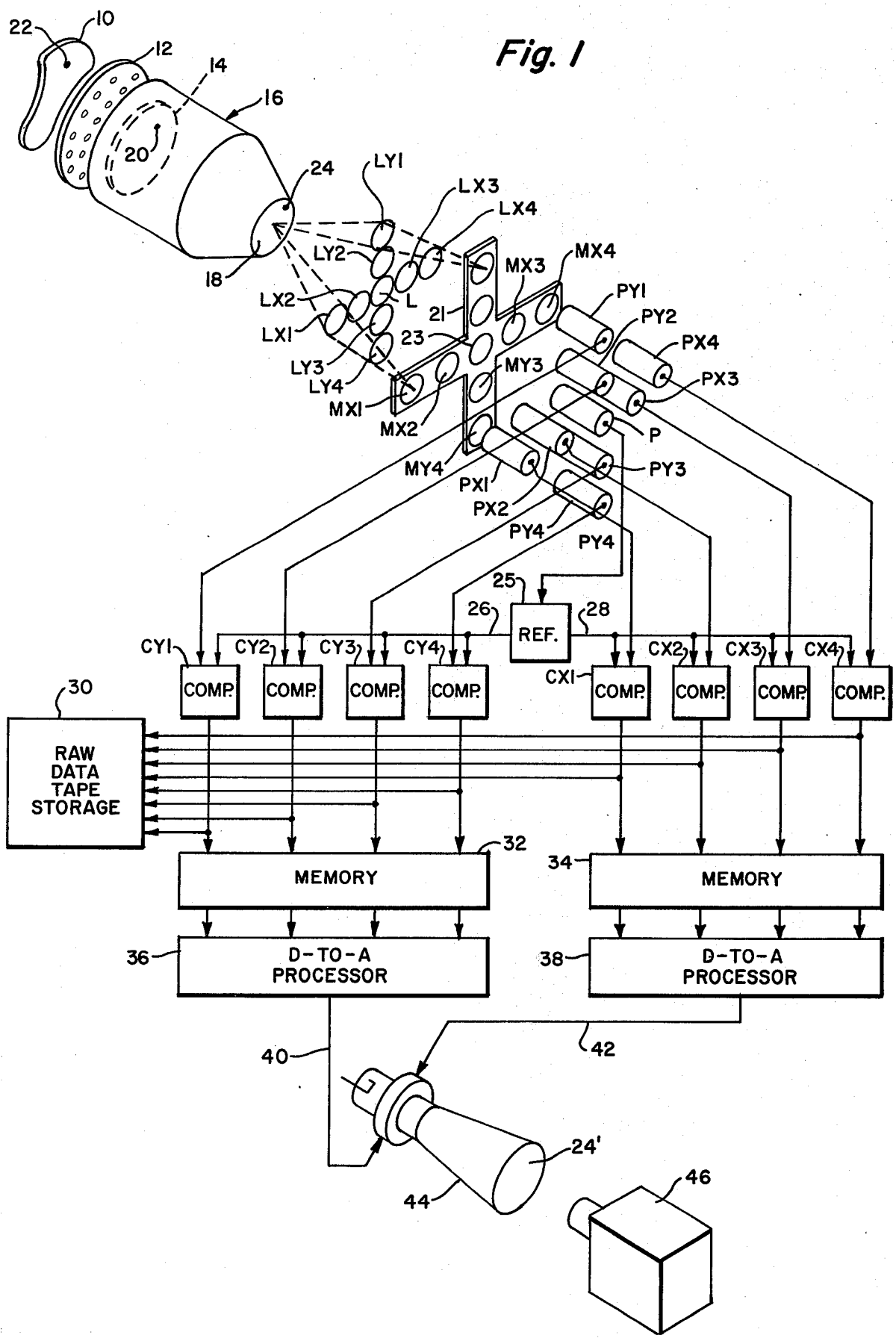
FIG. 1 is a schematic illustration of one embodiment of the invention utilizing lenses to project on the masks a field of view containing scintillations.

With reference now to the drawings, and particulary to FIG. 1, there is shown a body 10 containing radioactive material. The body 10, for example, may comprise the human body into which radioactive material has been injected intravenously. It is known, for example, that when radioactive material is injected into the human body intravenously, it will be preferentially absorbed by certain types of cells, such as cancer cells. Thus, the location of a cancer growth can be determined by locating the position of an area of greater-than-expected radiation.

The radiation from the body 10 is passed through a collimator 12 comprising a block of radiation-opaque material and perforated for a number of parallel elongated collimation channels. Only radiation proceeding in a straight-line direction toward the collimator 12 will be passed by the channels of the collimator 12 such that each scintillation produced on a scintillation screen 14 will be made to be in the same relative position as the corresponding sourcepoint was in the body 10. The scintillation screen 14 may, for example, comprise thallium-activated sodium iodide crystals in the form of a thin disc. It is carried within an electron-optics device 16 such as an image amplifier of the general type shown in Sternglass U.S. Pat. No. 3,462,601. The image amplifier 16 converts the scintillations appearing on the scintillator 14 into a flow of electrons forming an electron image corresponding to the radiation image directed onto the scintillator. The electron image emitted by the scintillator is accelerated by the tube 16 and then focused onto an output screen 18 which converts the electron image into a light image corresponding to the electron image incident thereon. Thus, assuming that a scintillation 20 occurs on the scintillator 14 due to a point source of radiation 22 in the body 10, a light spot 24, corresponding in location to the radiation point 22 will appear on the output screen 18, this light spot being amplified with respect to the scintillation appearing on the scintillation screen 14.

The present invention, as mentioned above, is concerned with locating the point or spot 24 and, hence, the X and Y coordinates of the scintillation 20 on the output screen 18. In this regard, a plurality of lenses LX1–LX4 is used for the X-coordinate masks, and similarly, a plurality of lenses LY1–LY4 is used for the Y-coordinate masks. At the intersection of the X and Y lenses is a central lens L which is used, in a manner hereinafter described, to provide for pulse height discrimination. In the figure, the X and Y lenses are shown disposed along the X and Y axes. This is for convenience of description only. The geometrical arrangement of the optical system is immaterial to providing location information, which is performed by the masks and the signal processing equipment.

The lenses LX1–LX4 and LY1–LY4 focus the image of the entire output screen 18 of tube 16 onto each of a plurality of masks at the focal planes of the lenses. Thus, lenses LX1–LX4 focus the image of the entire screen 18 onto corresponding masks MX1–MX4. Assuming that the masks are carried in a carrier 21, the intersection of the X and Y masks is provided with an opening 23 which permits all of the light from the lens L to pass therethrough. Again, this is used for pulse height discrimination purposes. Behind the opening 23 is an electron-optic device P such as photocell or photomultiplier tube. On either side of the central electron-optic device P along the X axis are similar electron-optic devices PX1–PX4. Similarly, above and below the central electron-optic device P along the Y axis are electron-optic devices PY1–PY4. The electron-optic devices, preferably photomultipliers, are aligned with their masks such that each photomultiplier is responsive to light passing through an associated one of the masks on carrier 21. The intensity of the light sensed by each one of the photomultipliers will, therefore, be proportional to the light passing through its associated mask.

Figure 2:
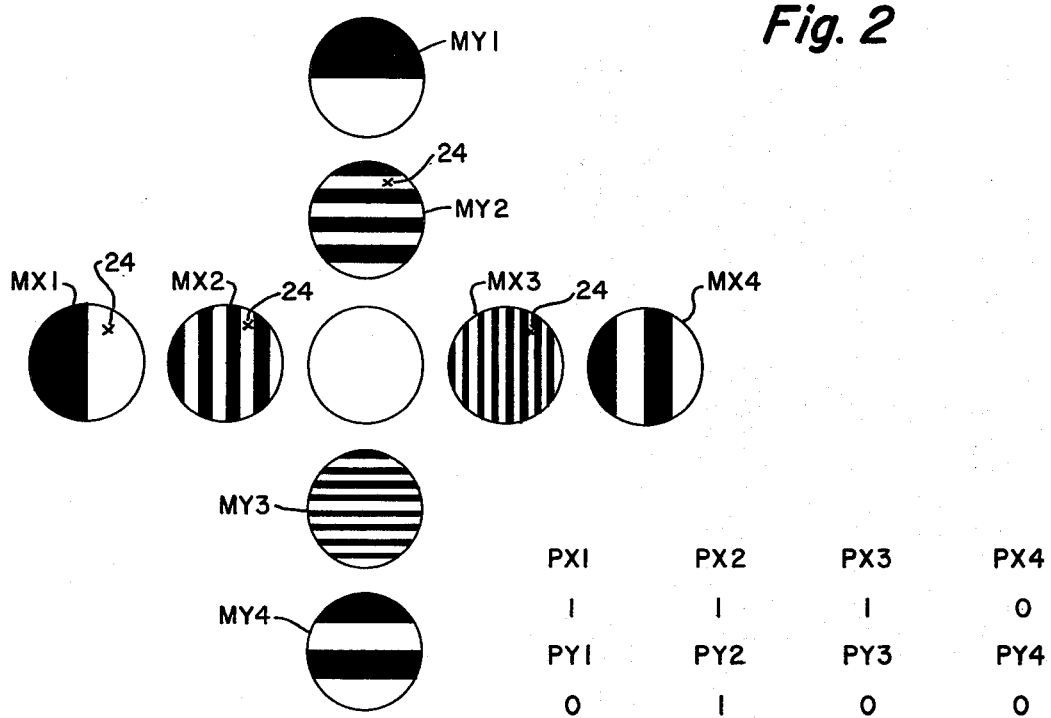
FIG. 2 is an enlarged view of the mask arrangement of FIG. 1 and wherein the masks are binary coded masks.

A typical form of the masks MX1–MX4 and MY1–MY4 is shown in FIG. 2. These comprise binary coded masks wherein one-half of each of the masks is opaque while the other is transparent. However, the arrangement of the opaque and transparent areas is such as to identify the location of a scintillation. Let us assume, for example, that the point light source 24 on screen 18, corresponding to scintillation 20, appears in the upper right-hand quadrant of the screen as shown in FIG. 2. Under the circumstances, the light will pass only through masks MX1, MX2, MX3 and MY2, because on the remaining masks, it encounters opaque areas. Each binary masks serves to further define and identify the location of the light spot in one direction or the other. Thus, mask MX1 identifies the light spot 24 as being on one side or the other of the Y axis, mask MX4 identifies whether it lies in even or odd quarters of the X axis, mask MX2 further limits the value of the X-coordinate and mask MX3 still further limits the X position. As will be appreciated, the number of masks employed can be increased to further increase the degree of resolution. The arrangement is the same for identification of the Y-coordinate, with each mask progressively defining to a greater precision the position of the light spot in the Y direction.

With the arrangement shown in FIG. 2, therefore, light from each lens will either pass through or be blocked entirely by its associated mask, depending upon the location of the light spot. Assuming that a 1 or ON signal is produced when light passes through a mask onto its associated electron-optic device and that a 0 or OFF signal is produced when it does not, the resulting binary code produced by the photocells PX1–PX4 and PY1–PY4 will be that shown at the bottom of FIG. 2. This code will be produced if, and only if, the light spot 24 appears in the position shown in FIG. 2. If it should shift, then an entirely different code will be produced.

The central photomultiplier P is used for pulse height analysis and for a total field intensity reference. Thus, the output of the photomultiplier P is applied to a circuit 25 in FIG. 1 which produces an output on leads 26 and 28 proportional to the intensity of the total field on the screen 18. This reference signal is then compared in comparators CX1–CX4 and CY1–CY4 to discriminate against field background noise and multiple pulses and to verify that a valid scintillation is being observed. That is, the comparators CY1–CY4 and CX1–CX4 will discriminate against low level noise and also against multiple scintillations, the locations of which cannot be determined simultaneously. Alternatively, the signal from the photomuliplier P may be compared with some standard reference, and if proper, used to activate gates which take the place of the comparators.

The outputs of the comparators CY1–CY4 and CX1–CX4 are applied to a raw data tape storage unit 30 such that the raw data from the comparators can be played back at a later date. The outputs of the CY1–CY4 comparators are also applied to a memory unit 32 which stores the information for a period of time. Similarly, the outputs of the comparators CX1–CX4 are applied to a second memory unit 34 which stores the digital signals indicative of the X axis position of the scintillation in order that these stored signals can be utilized to produce a magnified position signal. The outputs of the two memories 32 and 34 are then applied to digital-to-analog processors 36 and 38, respectively, which produce from the digital code provided analog signals on leads 40 and 42 proportional to the position of the scintillation along the X and Y axes, respectively. These signals can then be applied to the vertical and horizontal deflection coils of a CRT tube 44 whereby the location of the scintillation will appear as a spot 24' on the screen of the tube. This spot, however, will be brighter and will persist for a longer period of time than the original scintillation and the spot on the screen 18 because of the memory elements 32 and 34. The resulting pattern of dots on the face of the CRT tube 44 may then be photographed over a period of time (i.e., a time exposure) by means of a camera 46, for example, whereby a permanent record of the scintillations defining the outline of the radiated mass in body 10 is produced on the photographic film. Alternatively, the digital signals can be stored in a computer memory, and processed to provide contour intensity plots, or other desired displays of the information.

As will be appreciated, the number of mask-detector assemblies used in the arrangement of FIG. 1 is determined by the resolution or bits of information required. The total bits of information, B, is given by the formula $B = 2^n$, where $n$ is the sum of the X and Y masks employed. A practical limit to the number of spaces or bits is dictated by the size of the scintillation spot.

Figure 3:
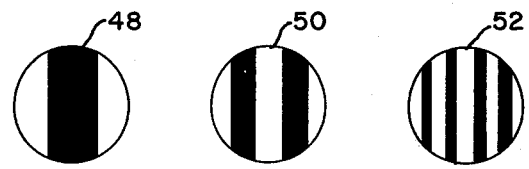
FIG. 3 illustrates another type of mask which may be used in accordance with the invention, namely Gray code masks.

Instead of using a binary code such as that shown in FIG. 2, a Gray code can be used as illustrated by the masks 48, 50 and 52 in FIG. 3. In this case, the dark areas are centered with respect to the center point of the mask. The coding is essentially the same as the binary code shown in FIG. 2, except that unavoidable errors at the boundary of clear and opaque zones will not be propagated to the far edge of the zone pair as in the case of a binary code. Position readout error will be minimized by an inherent convergence in the successively finer resolution masks since the Gray code neutralizes the effect of errors in the most significant logic figures.

It is within the scope of the present invention, of course, to use either a binary code, a Gray code, or any other code which will produce a series of digital output signals identifying the position of a scintillation on the screen 18. In any case, it is essential that the lens-mask conbinations maintain registration through fabrication, assembly and operation. Any mask fabrication process must have an inherent means for maintaining or achieving registration between the object and image plane positions as seen through the coupling lenses. The problem of optical distortion can be overcome by making the masks photographically through the coupling lenses themselves by means of master masks in the fluorescent screen plane, or even the input plane. The masks can be separate films or plates or they can all be produced on one large photographic glass plate. In either case, precise reorientation of the master masks and the coding masks produced is imperative. Such masks can be produced by drawing, photoreducing, etching or other means, but accurate orientation involving the optical coupling is mandatory. Note from FIG. 1 that the masks are positioned in the image focal plane of the respective lenses LX1–LX4 and LY1–LY4.

Figure 4:
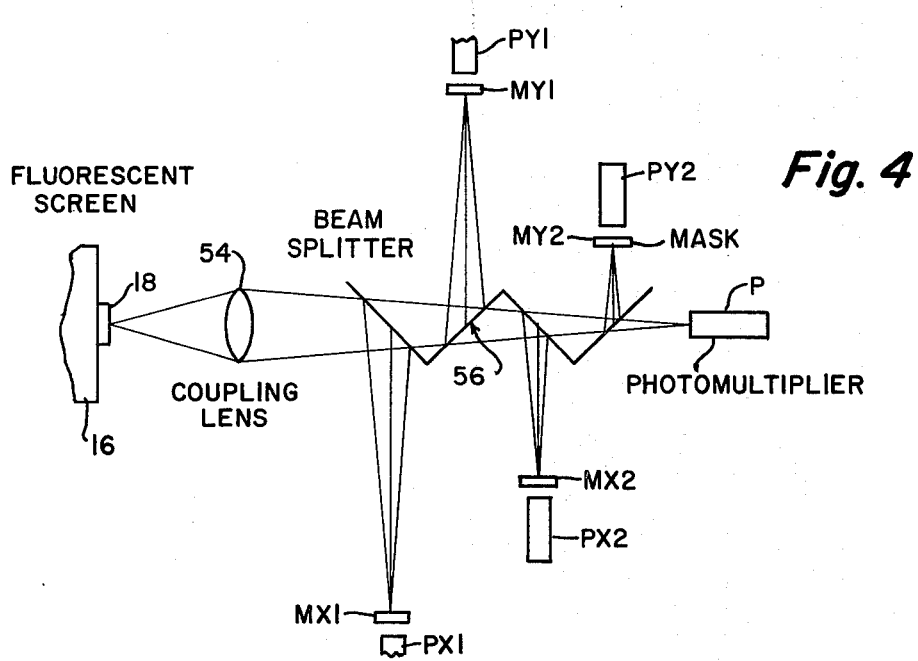
FIG. 4 illustrates an alternatively embodiment of the invention wherein beam splitters are employed to direct a field of view onto masks.

As alternative arrangement employing a single lens in a beam splitter arrangement is shown in FIG. 4. Thus, a single lens 54 directs light through a beam splitter comprising a plurality of partially reflecting and partially transmitting surfaces 56 disposed at an angle of 45° with respect to the axis of lens 54. The focal point of the lens 54 terminates at photomultiplier P corresponding to that shown in FIG. 1. This photomultiplier may be used as a reference against which the outputs of the remaining photocells are used to discriminate against background noise and double scintillations, in the same manner as in FIG. 1. The remaining photomultipliers identified as PX1, PX2, PY1 and PY2 are provided with corresponding masks MX1, MX2, MY1 and MY2. These masks are placed in the image focal planes of the lens as reflected from the beam splitters. The operation of the system is the same as that shown in FIG. 1 except, of course, that light impinges upon each of the masks by virtue of the beam splitter rather than by way of a plurality of lenses as in FIG. 1. The focal length of the lens 54 should be sufficient to allow placement of all beam splitters in the optical paths to the masks and to provide the appropriate image size on the masks.

Instead of using a plurality of individual lenses as shown in FIG. 1, sets of cylinder lenses 58 and 60 can be used as shown in FIG. 5. These will convert the scintillation dot of light into perpendicular line images whose positions will shift as the location of the dot changes. Such lenses will suffice to accommodate a number of masked detectors, the vertical lenses being employed for X-location, and the horizontal ones for Y-location.

In FIG. 6, still another embodiment of the invention is shown employing a lenticular screen. A mask 62 drawn here highly magnified is placed over the screen 18 of the image tube. Formed on the screen 18 is a scintillation 24, corresponding to that shown in FIG. 1, which is behind the mask 62. In this technique, each element or area on the screen 18 is supplied with its own mask and lens, the lenses being identified in FIG. 6 by the numeral 64. The lenses are provided on a sheet of plastic combined with a photographic transparency comprising the mask 62. The nature of the miniature mask located at the focus of each lens is such that illumination of any small area behind the mask 62 results in a set of beams, such as beams 66 and 68, which project onto two photomultipliers of a plurality of photomultipliers 70. The mask can be made originally by using the same lenses to expose a film affixed in the mask position, and by illuminating each element successively with a set of lamps in the positions of the photomultipliers, turning them ON or OFF as successive elements are exposed in accordance with the desired code. That is, the film, after exposure and developing in this manner, becomes the mask 62. The outputs of the photomultipliers 70 will then be applied to circuitry similar to that of FIG. 1, the outputs of the photomultipliers comprising digital signals which can then be converted into analog signals from an X-Y display.

In FIGS. 7 and 8, still another embodiment of the invention is shown which, instead of using masks, employs fiber optic bundles. In FIG. 7, the fiber optic bundle is identified by the reference numeral 72 and receives light from the screen 18 of image tube 16, similar to that of FIG. 1. Selected ones of the fibers in the optic bundle 72 are directed onto respectives ones of a plurality of photomultipliers 74, there being five photomultipliers in the arrangement of FIG. 7 identified as 74-1, 74-2, 74-3 and 74-4, together with a central photomultiplier P coupled to all sensing elements or areas of the fiber optic bundle 72 for the purpose of pulse detection and height analysis, the same as in the arrangement of FIG. 1.

A map of the optic fiber bundles as viewed from the screen 18 is shown in FIG. 8. As can be seen, the screen 18 is divided into 16 areas. Optic fibers associated with photomutiplier P receive light from each of the sixteen areas; and this light is directed to that photomultiplier P. The optic fibers which direct light to the photomultipliers 74-1, 74-2, 74-3 and 74-4, however, connect only to selected ones of the sixteen areas on the screen 18. Thus, as shown in FIG. 8, optic fibers receive light and direct it to the first photomultiplier 74-1 of FIG. 1 from the first four of the sixteen areas across the top of the screen as well as from the third row of areas. The third photomultiplier 74-3 receives light via the optic fibers from the first and second rows. Thus, it is known that if photomultipliers 74-1 and 74-3 both receive light, the scintillation is in the upper fourth of the screen 18. If light is received only by photomultiplier 74-3, the scintillation is in the second vertical column; if light is received by only photomultiplier 74-1, it is in the third vertical column; and if light is received by neither of the photomultipliers 74-1 and 74-3, the scintillation is in the fourth or bottom row.

The arrangement of the X-axis detector bundles is similar in that none of the optic fibers leading to photomultipliers 74-2 and 74-4 are directed against the leftmost column along the X axis. The optic fibers in the two intermediate columns along the X axis direct light to the photomultipliers 74-2 and 74-4, respectively; and those in the extreme right-hand colum direct light to both the photomultipliers 74-2 and 74-4. The output of the photomultipliers 74-1, 74-2, 74-3 and 74-4, for each position of the scintillation, will be a characteristic, distinct code which identifies one of the sixteen areas of the screen in which the scintillation is located. As will be appreciated, the number of areas can be increased above 16 to improve resolution if desired.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. In a radioisotope imaging system, the combination of an amplified-scintillation means including a scintillation screen within an image-amplifier electron-optic device for emitting amplified visible scintillations in a field of view in response to incident radiation, a plurality of electron-optic detectors, an optical system viewing said field of view and which projects light from said field of view to said plurality of electron-optic detectors and on optical coding means incorporated into said optical system and adapted to conduct light produced by an amplified scintillation to certain of said detectors while not permitting light to pass to other of the detectors, whereby the detectors will produce ON and OFF digital signals forming a code identifying the location of said scintillation in said field of view.

2. The radioisotope imaging system of claim 1 including means for focusing the entire field of view onto each of said plurality of electron-optic detectors.

3. The radioisotope imaging system of claim 1 including a plurality of lenses for focusing said field of view onto masks disposed before respective ones of a plurality of electron-optic detectors whereby for a given position of a scintillation in said field of view, certain of the detectors will receive light while others will not, the totality of the outputs of said detectors comprising a digital signal.

4. The radioisotope imaging system of claim 3 including means for processing said digital signals into X and Y analog signals, and means responsive to said X and Y analog signals for displaying the position of a scintillation in said field of view.

5. The radioisotope imaging system of claim 4 including an electron-optic detector for sensing light from the entire field of view and for producing and electrical signal proportional to the magnitude of light from the entire field of view, and comparator means for comparing the output of said last-mentioned electron-optic detector with the remainder of the electron-optic detectors to discriminate against background noise and simultaneous scintillations.

6. The radioisotope imaging system of claim 1 wherein said optical system viewing said field of view comprises an optic fiber bundle.

7. The radioisotope imaging system of claim 6 wherein selected ones of the optic fibers in said bunlde view discrete areas of said field of view and direct light onto a number of said electron-optic detectors which will produce an output digital signal indicative of the position of a scintillation in said field of view.

8. The radioisotope imaging system to claim 1 wherein said optical coding means comprises a mask and lenticular screen means for directing light from a scintillation onto a plurality of detectors.

9. The radioisotope imaging system of claim 1 wherein said optical coding means includes a single lens viewing said field of view, beam splitter means for directing portions of light passing through said single lens onto masks interposed before said plurality of electron-optic detectors.

10. The radioisotope imaging system of claim 1 including means for storing said digital signals for subsequent processing.

* * * * *